US008234241B2

(12) United States Patent
Kratz et al.

(10) Patent No.: US 8,234,241 B2
(45) Date of Patent: Jul. 31, 2012

(54) METHODS, SYSTEMS, AND COMPUTER PROGRAM PRODUCTS FOR REDUCING DATABASE WORKLOAD VOLUME

(75) Inventors: Geoffrey G. Kratz, Calgary, CA (US); Chon N. Lei, Poughkeepsie, NY (US); Rajesh P. Ramachandran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 11/619,797

(22) Filed: Jan. 4, 2007

(65) Prior Publication Data

US 2008/0168025 A1 Jul. 10, 2008

(51) Int. Cl.
*G06F 7/00* (2006.01)
*G06F 17/00* (2006.01)
*G06F 17/30* (2006.01)

(52) U.S. Cl. .................. 707/608; 707/662; 707/754
(58) Field of Classification Search .............. 707/1, 10, 707/204; 709/223; 717/136, 141
See application file for complete search history.

(56) References Cited

U.S. PATENT DOCUMENTS

| | | | |
|---|---|---|---|
| 5,793,401 A * | 8/1998 | Peter | 347/142 |
| 5,870,578 A | 2/1999 | Mahalingaiah et al. | |
| 5,875,334 A * | 2/1999 | Chow et al. | 717/141 |
| 6,275,818 B1 * | 8/2001 | Subramanian et al. | 707/2 |
| 6,598,038 B1 | 7/2003 | Guay et al. | |
| 6,665,664 B2 * | 12/2003 | Paulley et al. | 1/1 |
| 7,287,048 B2 * | 10/2007 | Bourbonnais et al. | 707/204 |
| 7,603,389 B2 * | 10/2009 | Holenstein et al. | 707/201 |
| 2002/0077962 A1 * | 6/2002 | Donato et al. | 705/37 |
| 2004/0068479 A1 * | 4/2004 | Wolfson et al. | 707/1 |
| 2004/0249782 A1 | 12/2004 | Ricci | |

* cited by examiner

*Primary Examiner* — Susan Chen
(74) *Attorney, Agent, or Firm* — Cantor Colburn LLP; William A. Kinnaman, Jr.

(57) ABSTRACT

Methods, systems and computer program products for reducing database workload volume. Methods include collecting a sequence of database commands directed to a single database record in a database. The sequence of database commands are reduced to a net result by combining database commands within the sequence of database commands. The net result is written to an output entity when the net result includes a database command.

19 Claims, 4 Drawing Sheets

METHODS, SYSTEMS, AND COMPUTER PROGRAM PRODUCTS FOR REDUCING DATABASE WORKLOAD VOLUME

BACKGROUND OF THE INVENTION

This invention relates generally to computer systems, and more particularly to reducing database workload volume.

Large cash and derivatives exchanges have some of the most aggressive requirements for throughput, responsiveness, and reliability. One of the key elements in an exchange is an order book. The order book holds orders prior to any form of matching between buyers and sellers at the exchange. It is important that the order book is protected against loss or corruption of data in the event of a failure. In addition, the order book must support a high volume of access, in some cases as many as tens of thousands of accesses per second. One way that the order book is protected is through storage in a database. A common problem is that performance requirements for storing the order book are such that conventional database techniques are not adequate relative to speed requirements.

In order to improve performance on the hardware side, high speed fixed hard drives available may be utilized, along with large memory caches on disk controllers, storage area networks and use of striping when available. Another approach is to use solid state disk drives in order to minimize the impact of the latency of writing to a physical medium. Both of these approaches deliver trading performance gated by hardware speed, which caps throughput at several thousand orders per second. Since one or more structured query language (SQL) statements are created for each order, throughput is constrained by the speed of a single processor to process these SQL statements. Also, these higher speed devices lead to more expensive solutions.

On the software side, performance may be improved by tuning the database and adding customized code to specifically handle the order book load. This may be done in conjunction with the hardware techniques described above to ensure that they compliment each other. Another approach is to batch up instructions as much as possible, and to maximize database throughput by committing periodically (generally after processing a specific number of orders or after a set period of time) rather than after every SQL statement. Another alternative is to use in-memory databases and to replicate the data to another active instance of the system, rather than trying to use some kind of persistent physical storage. This often results in complex systems that rely on high-speed middleware to ensure that data is replicated reliably.

While using faster hardware or batching database instructions may increase performance, these techniques do not reduce the total volume of database instructions, thus limiting performance. Therefore, what is needed is a method to reduce the number of database instructions to a minimum while maintaining the integrity of the database instruction sequence and also meeting the performance requirements.

BRIEF SUMMARY OF THE INVENTION

Embodiments include a method for reducing database workload volume. The method includes collecting a sequence of database commands directed to a single database record in a database. The sequence of database commands are reduced to a net result by combining database commands within the sequence of database commands. The net result is written to an output entity when the net result includes a database command.

Further embodiments include a system for reducing database workload volume. The system includes a processor and an output entity. The processor executes instructions to facilitate collecting a sequence of database commands directed to a single database record in a database. The sequence of database commands are reduced to a net result by combining database commands within the sequence of database commands. The output entity records the net result when the net result includes a database command.

Still further embodiments include a computer program product for reducing database workload volume. The computer program product includes a storage medium readable by a processing circuit and storing instructions for execution by the processing circuit for facilitating a method. The method includes collecting a sequence of database commands directed to a single database record in a database. The sequence of database commands are reduced to a net result by combining database commands within the sequence of database commands. The net result is written to an output entity when the net result includes a database command.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
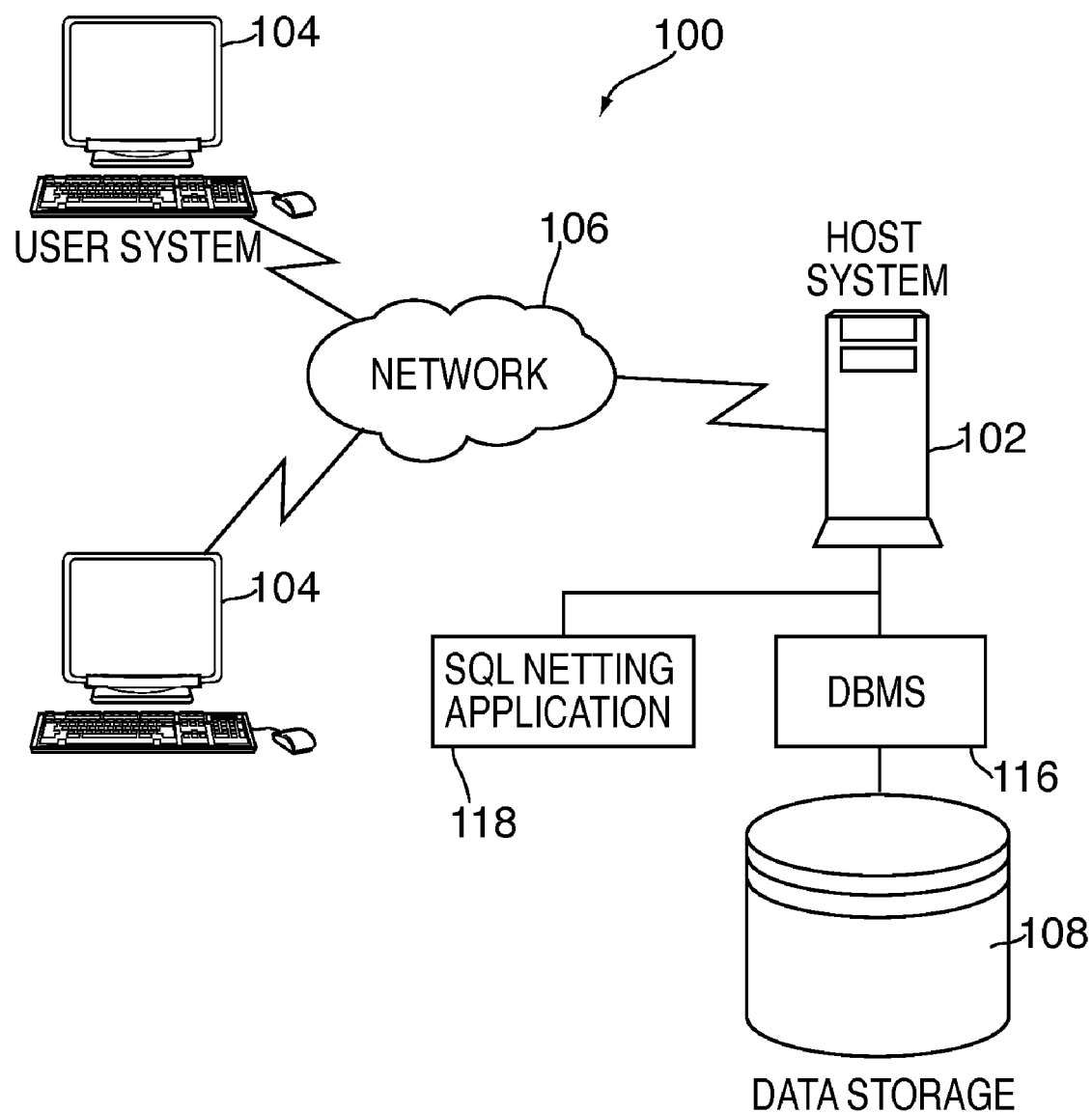
FIG. 1 illustrates one example of a block diagram of a system upon which SQL netting may be implemented in exemplary embodiments.

In exemplary embodiments, a high volume of database instructions is supported via a method of batching a sequence of database instructions and reducing the number of database instructions. Database instructions are consolidated before being applied (or committed) to the database. In exemplary embodiments, the database instructions are in the form of structured query language (SQL) statements, which support creation, modification, retrieval, and manipulation of data in a database management system (DBMS). Although the database instructions are referred to as "SQL statements", it will be understood by those skilled in the art that "SQL statements" may include any form of database programming or query language.

The phrase "SQL netting" as used herein refers to exemplary embodiments that are utilized when SQL statements directed to the same database record are batched up and committed in blocks. The SQL statements include a combination of one or more INSERT, UPDATE, and DELETE instructions to maintain state information in a database table for a single database record, where the SQL is always applied in a particular order. The objective of exemplary embodiments is to keep the database table in the same state as if all of the instructions were executed at the database.

An example of an application involving a high volume of database transactions is a trading system, where orders are matched between buyers and sellers using an order book. In a trading system, a trade may occur when two or more orders meet each other's criteria for order volume and price. At an exchange, such as the New York Stock Exchange, there is typically one order book for each symbol (e.g., "IBM" and "GE"). An order book typically includes ranked lists of buy orders and sell orders. When buy orders and sell orders do not match in volume and price, multiple trades may be needed to complete an order.

In exemplary embodiments, the order book contains two ranked lists of orders, one list for buy orders and one list for sell orders. In exemplary embodiments, the orders are ranked using a method called price-time priority. Orders are first ranked by price, with orders with a better price ranked higher than orders with a worse price. Each distinct price is known as a price level. When two or more orders have the same price (i.e., are in the same price level), the orders are sorted from oldest to newest, with the oldest order having a higher ranking and thus eligible for matching ahead of newer orders. This is also known as first-in-first-out (FIFO) ordering. The definition of better price and worse price depends on the side of the order. For buy orders, a better price is one that is higher than the other orders. For sell orders, a better price is one that is less than the other orders. When looking at a visual view of an order book, the buy orders are sorted in sequence of higher price to lower price, and the sell orders are sorted from lower price to higher price.

One of the challenges in generating trades and maintaining the order book is that only one order at a time can be processed. Therefore, while some parallelism and other techniques could be used to improve performance, conventional trading rules, and in some cases the law, require that only one order at a time be processed for a single symbol.

For example, if a buy order is inserted into an order book with a volume of 2000 shares at a price of $89.75, and the order book contains a sell order with a volume of 1500 shares at a price of $89.75, then these two orders may be matched as a trade; but, the order book will still hold a buy order with a volume of 500 shares at a price of $89.75 as a residue from the original buy order. Once the remaining buy order is fulfilled, in one or more trades with corresponding sell orders, then the buy order may be removed from the order book. In exemplary embodiments, the order book is maintained in a database to protect against loss or corruption of data in the event of a failure, and each order in the order book is a record within the database.

The order book can represent millions or even billions of dollars in value, and it is important that it not be corrupted or lost. One technique for protecting the order book is to persist it to a relational database such as DB2. While straightforward in concept, the performance of the system can be governed by the speed of the database, particularly during a situation known as a hot stock problem where a large volume of orders are directed to a single stock symbol within a relatively short period of time. The issue for performance is that the order book, unlike other structures in a trading system, is not typically kept as a historical log, but instead represents the current state of the book. As a result, the changes to the order book table are sequence-dependent; they are dependent on the sequence of events that caused the changes originally. This arises because the trading system can only process one order at a time on the order book. This is a business constraint imposed by the nature of the price-time priority rules commonly used at exchanges. Further, the order book is often cached in memory, as well as persisted to disk, to enhance performance. It is therefore critical that the state of the order book in memory match the state of the order book in the database. The only way to do this consistently is to ensure that the changes to the order book table are done in the same order as they were on the in-memory book.

Exemplary embodiments relate to reducing the number of database transactions when multiple SQL statements are requested against a record in a database within a period of time (e.g., as defined by an application parameter). By examining a sequence of SQL statements targeting a common record or collection of records, the sequence (or number of SQL statements) may be reduced through a process referred to herein as "SQL netting". Through SQL netting, the sequence of SQL statements may be reduced to a single SQL statement with an equivalent net effect as if all SQL statements had been sequentially executed. Furthermore, the sequence of SQL statements may be reduced to no SQL statements at all, such as when the sequence includes both an insert to a record and a delete operation to the same record, or a similar combination.

The period of time over which the SQL statements are collected and reduced through SQL netting may vary depending upon the particular requirements of the application. For example, in a trading system during a high volume period when a particular stock gets "hot" on a stock exchange, tens of thousands of orders per second may be placed. Alternatively, a bank may receive a couple of transaction requests against an account during off hours. In each example, the period of time in which a sequence of SQL statements is collected for SQL netting may be adjusted or customized to best fit the application demands.

Turning now to the drawings in greater detail, it will be seen that in FIG. 1 there is a block diagram of an exemplary system upon which SQL netting may be implemented. The system 100 of FIG. 1 includes a host system 102 in communication with user systems 104 over a network 106. Host system 102 may be implemented, for example, by a high-speed processing device (e.g., a mainframe computer) that handles large volumes of processing requests from user systems 104. In exemplary embodiments, host system 102 functions as an application server and a database management server. User systems 104 include desktop, hand held and/or general-purpose computer devices that generate data and processing requests, such as requests to place orders or perform transactions. While only a single host system 102 is shown in FIG. 1, it will be understood that multiple host systems may be implemented, each in communication with one another via direct coupling or via one or more networks. For example, multiple host systems may be interconnected through a distributed network architecture. The single host system 102 may also represent a cluster of hosts accessing a common data store, e.g., via a clustered file system which is backed by a data storage device 108.

Network 106 may be any type of communications network known in the art. For example, network 106 may be an intranet, extranet, or an internetwork, such as the Internet, or a combination thereof. Network 106 may be a wireless or wireline network.

Data storage device 108 refers to any type of storage and may comprise a secondary storage element, e.g., hard disk drive, tape, or a storage subsystem that is external to host system 102. Types of data that may be stored in data storage device 108 include archive data that are infrequently accessed such as transaction history, and databases that may be accessed with greater frequency. For example, data storage device 108 may hold a database with records of trade activity and orders at a cash or derivatives exchange, such as the New York Stock Exchange. It will be understood that data storage device 108 shown in FIG. 1 is provided for purposes of simplification and ease of explanation and is not to be construed as limiting in scope. To the contrary, there may be multiple data storage devices utilized by the host system 102.

In exemplary embodiments, host system 102 executes various applications, including a database management system (DBMS) 116 and an SQL netting application (SQLNA) 118. Other applications, e.g., business applications, a web server, etc., may also be implemented by host system 102 as dictated by the needs of the enterprise of the host system 102. DBMS 116 maintains one or more databases, controlling read and write accesses to data storage device 108 in which databases are stored.

User systems 104 may access host system 102 to request an order placement or a transaction. When host system 102 receives the request, host system 102 may convert the request to a SQL statement which DBMS 116 may use in managing a database stored on data storage device 108. As multiple requests are received, host system 102 may convert the requests to a sequence of SQL statements and pass the sequence to SQLNA 118. As described in greater detail herein, SQLNA 118 may use SQL netting to reduce the sequence of SQL statements, passing the net result to DBMS 116. SQLNA 118 may work in conjunction with DBMS 116 to manage SQL statements targeted for a database in data storage device 108; although, it is understood that SQLNA 118 may be incorporated with DBMS 116 as a single entity.

In exemplary embodiments in a trading system, when an order arrives at host system 102, an "INSERT" SQL statement may be generated. When an order is traded partially, such as buying 400 shares in a buy 1000 share order, host system 102 may generate an "UPDATE" SQL statement. When an order is traded completely, such as buying the 600 share residue from the buy 1000 share order, host system 102 may generate a "DELETE" SQL statement. Host system 102 may generate SQL statements, but as a result of the reduction performed by SQLNA 118, DBMS 116 may not perform the SQL statements for each trade of an order.

Figure 2:
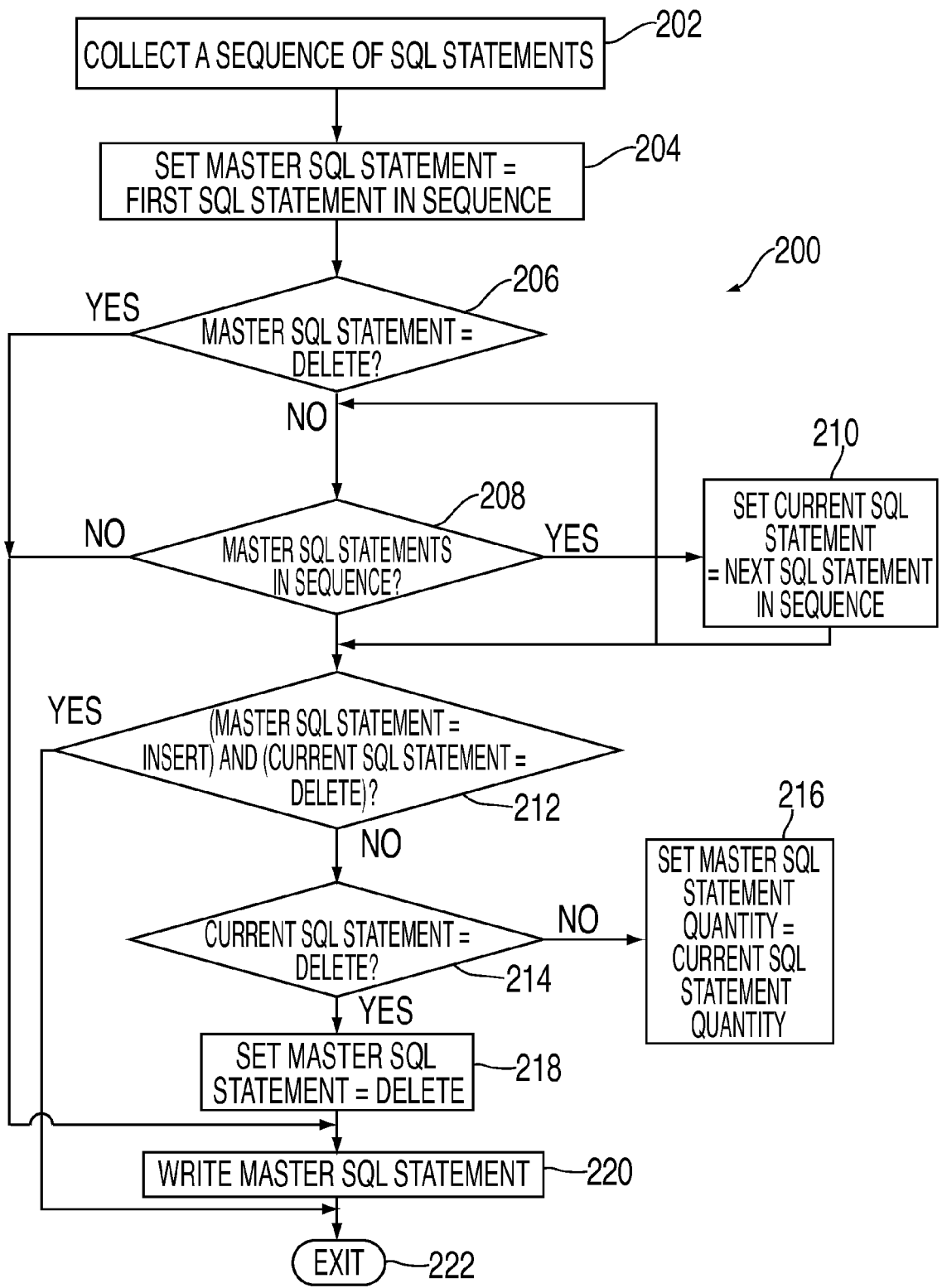
FIG. 2 illustrates one example of a flow diagram describing a process for performing SQL netting in exemplary embodiments.

Turning now to FIG. 2, a SQL netting process 200 for implementing SQLNA 118 will now be described in accordance with exemplary embodiments using a stock trading application as an example application. At block 202, SQLNA 118 collects a sequence of SQL statements directed to the same database record. Each SQL statement may contain an operation request, such as INSERT, UPDATE, or DELETE. Referring to the stock trading application, when an order arrives, an INSERT is generated. When an order is traded partially (such as buying 400 shares in a buy 1000 share order), an UPDATE is generated. When an order is traded completely (such as buying the remaining 600 shares in the above example), a DELETE is generated. An SQL statement is generated (but not executed) for each trade of an order, including the INSERT statement that is generated when an order arrives. Each SQL statement may also contain one or more value parameters also referred to as a quantity (e.g., volume=1000) and price (e.g., price=$89.75).

At block 204, the first SQL statement in the sequence is designated as the "master" SQL statement. The master SQL statement may be modified and written as the net result of the SQL netting process. If the order has arrived during this period, then the first SQL statement, or master SQL statement, will be an INSERT. If the order existed in a previous period of time, then the first SQL statement, or master SQL statement, will be an UPDATE or a DELETE. At block 206, the master SQL statement is checked to determine whether a delete operation is requested. If a delete operation is requested at block 206, then the process skips to block 220 to write the master SQL statement; otherwise, the process continues to block 208. At block 208, a check is performed to determine whether any more SQL statements exist in the sequence. If there are no more SQL statements in the sequence, then the process continues at block 220; otherwise, the process continues at block 210.

Continuing with the SQL netting process 200 depicted in FIG. 2, at block 210, the next SQL statement in the sequence becomes the current SQL statement under analysis. At block 212, a check is performed to determine whether both the master SQL statement is an insert operation and the current SQL statement is a delete operation. If both conditions of block 212 are true, then the process continues at block 222; otherwise, the process continues to block 214. At block 214, a check is performed to determine whether the current SQL statement is a delete operation. If the current SQL statement is a delete operation, then the process continues at block 218; otherwise, the process branches to block 216. At block 218, the master SQL statement is set to a delete operation and the process continues to block 220. At block 216, any quantity in the current SQL statement is copied to the master SQL statement. If a related quantity existed in the master SQL statement, then the quantity is updated in the master SQL statement; otherwise, the quantity is inserted in or appended to the master SQL statement. For example, if the master SQL statement is "UPDATE Volume 2000" and the current SQL statement is "UPDATE Volume 1500", then the master SQL statement becomes "UPDATE Volume 1500". However, if the master SQL statement is "UPDATE Volume 1500" and the current SQL statement is "UPDATE Price 89.75", then the master SQL statement becomes "UPDATE Volume 1500 Price 89.75".

Continuing with the SQL netting process 200 depicted in FIG. 2, after block 216, the process flow loops back to block 208. At block 220, the master SQL statement is written to an output entity. The output entity may be a file or a data structure within host system 102. Alternatively, the output entity may be a data structure shared with DBMS 108 or a file on data storage device 108. Any SQL statements written to the output entity may be committed to the database in data storage device 108 either before or after SQL netting process 200 completes. In exemplary embodiments, there will be one master SQL statement (or net result) generated for each order. Subsequently, all the master SQL statements written to the output entity will be applied to the database in a unit of work. At block 222, SQL netting process 200 completes.

Figure 3A:
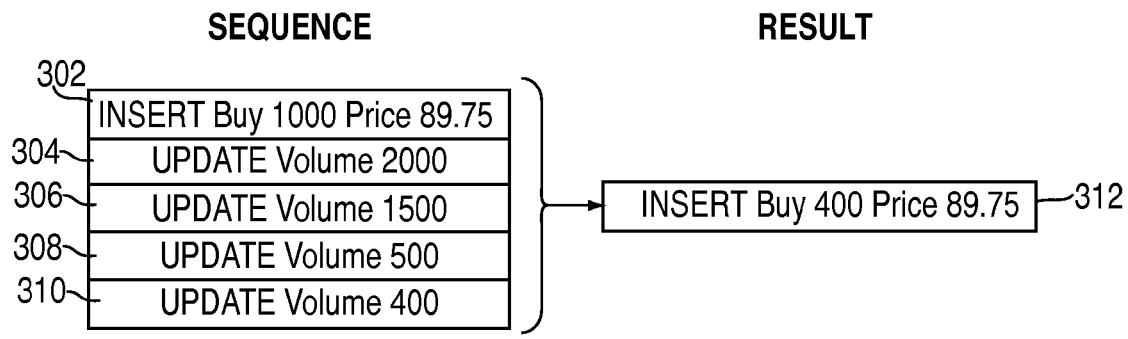
FIG. 3A illustrates one example of SQL netting for insert and update statements in exemplary embodiments.

FIGS. 3A, 3B, 3C, and 3D depict examples of possible results of SQL netting in exemplary embodiments. In FIG. 3A, a sequence of SQL statements includes an initial "INSERT" SQL statement 302 followed by a series of "UPDATE" SQL statements 304, 306, 308, and 310. The resulting SQL statement after SQLNA 118 performs SQL netting process 200 is an "INSERT" SQL statement 312 with the volume quantity updated to reflect the net result of the series of "UPDATE" SQL statements 304, 306, 308, and 310.

Figure 3B:
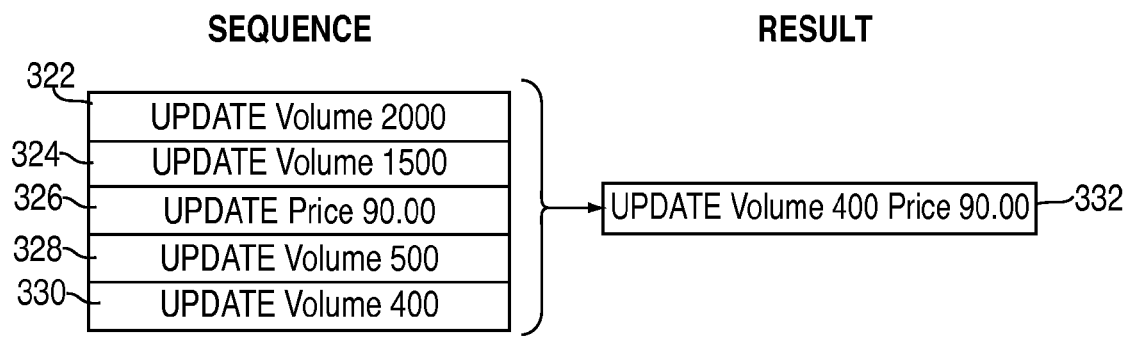
FIG. 3B illustrates one example of SQL netting for update statements in exemplary embodiments.

In FIG. 3B, a sequence of SQL statements includes a series of "UPDATE" SQL statements 322, 324, 326, 328, and 330. The resulting SQL statement after SQLNA 118 performs SQL netting process 200 is an "UPDATE" SQL statement 332 with the price and volume quantity updated to reflect the net result of the series of "UPDATE" SQL statements 322, 324, 326, 328, and 330.

Figure 3C:
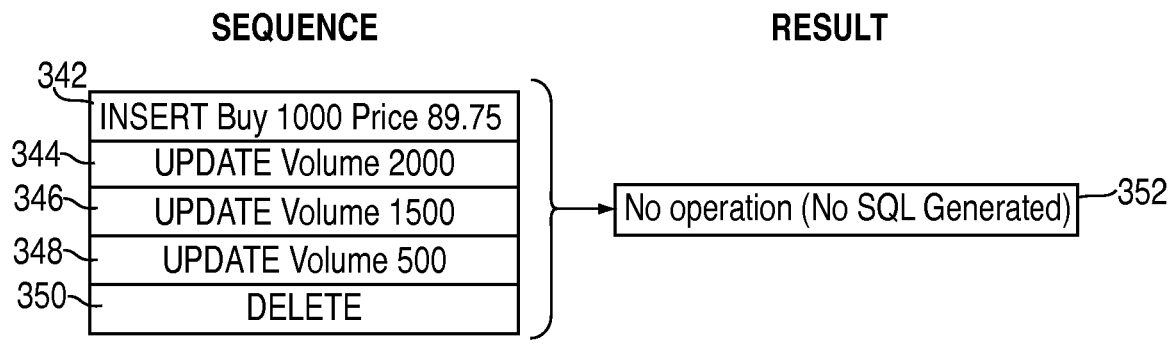
FIG. 3C illustrates one example of SQL netting for insert and delete statements in exemplary embodiments.

In FIG. 3C, an initial "INSERT" SQL statement 342 is followed by a series of "UPDATE" SQL statements 344, 346, 348 and a "DELETE" SQL statement 350. There is no resulting SQL statement, shown as no operation 352, after SQLNA 118 performs SQL netting process 200, because the record was both created and deleted within the SQL statement sequence.

Figure 3D:
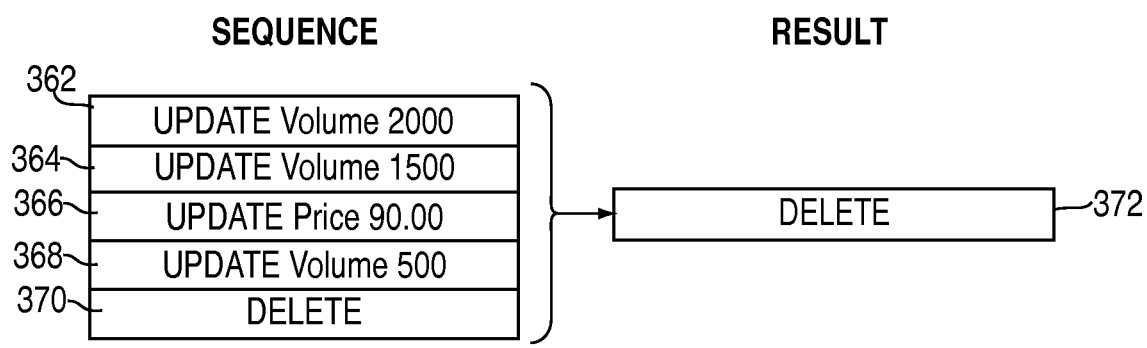
FIG. 3D illustrates one example of SQL netting for update and delete statements in exemplary embodiments.

In FIG. 3D, a sequence of SQL statements includes a series of "UPDATE" SQL statements 362, 364, 366, 368 and a "DELETE" SQL statement 370. The resulting SQL statement after SQLNA 118 performs SQL netting process 200 is a "DELETE" SQL statement 372. The example depicted in FIG. 3D results in a delete operation, because the SQL statement sequence does not contain an "INSERT" SQL statement. Therefore, the target record of the SQL statement sequence must have been previously created, thus a delete operation must be performed, as opposed to the example depicted in FIG. 3C.

Exemplary embodiments have been described with reference to a stock trading application that is implemented in a database that accepts SQL statements. As will be appreciated by those skilled in the art, exemplary embodiments may be applied to other applications (e.g., banking and on-line auctions) and to other types of database access languages (or database commands) besides SQL statements. Exemplary embodiments may be beneficial for applications where there are typically more than one SQL statement within a single unit of work and when more than one SQL statement in the unit of work applies to the same record in the same table (e.g., when there are a combination of INSERT, UPDATE and DELETE commands against a single record). Both of these criteria generally hold true in a stock trading application, because a single order, if it causes trades to occur, will interact with one or more orders on the other side of the market. In addition, to improve performance, the unit of work in a stock trading system can be created to span multiple inbound orders.

Alternate exemplary embodiments include other applications where multiple accesses to the same record in a database can be netted down to a smaller number of accesses. In exemplary embodiments, a banking application may update an account multiple times due to multiple transactions performed on the account. Although an account is generally updated instantly when a transaction takes place during the prime shift, transactions coming in at night may be batched and updates performed at a later time. SQL netting process 200 may reduce the number of accesses to a database that manages the account.

Technical effects and benefits of exemplary embodiments include reducing database workload volume through SQL netting. SQL netting reduces the total number of database instructions performed by batching a sequence of SQL statements and reducing the sequence down to zero or one net SQL statement. SQL netting increases overall system performance and bandwidth through minimizing the number of accesses to a database on a slower data storage device, while maintaining the integrity of the SQL statement sequence.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer implemented method for reducing database workload volume, the method comprising:
  collecting a sequence of database commands directed to a single database record in a database, the database commands comprising instructions for modifying data in the database;
  setting, via the computer, a net result equal to a first database command in a sequence of database;
  determining whether the net result is a delete command;
  responsive to determining that the net result is not a delete command, preforming:
  updating, via the computer, the net result equal to no database command and exiting in response to determining that the first database command in the sequence of database commands is an insert command and a subsequent database command in the sequence of database commands is the delete command;
  updating, via the computer, the net result equal to the delete command in response to determining that the first database command is not the insert command and the subsequent database command in the sequence of database commands is the delete command; and
  updating, via the computer, a quantity in the net result equal to a quantity in the subsequent database command in the sequence of database commands in response to determining that the subsequent database command in the sequence of database commands includes the quantity and the net result is not equal to the delete command; and writing the net result to an output entity in response to determining that the net result includes at least one database command;
wherein the reducing further comprises removing at least one database command in the sequence of database commands that is prior to the delete command in the sequence of database commands.

2. The method of claim 1 wherein the sequence of database commands is within a unit of work that has not been committed to the database.

3. The method of claim 1 wherein the reducing further comprises removing a first update command in the sequence of database commands that is prior to a second update command in the sequence of database commands.

4. The method of claim 3 wherein the reducing further comprises setting the net result to the second update command if the second update command is not followed by another update command or the delete command in the sequence of database commands.

5. The method of claim 1 wherein the database commands are structured query language (SQL) statements.

6. The method of claim 1 wherein the reducing further comprises:
in response to determining that the first database command in the sequence of database commands is not the delete command, and further determining that the first database command in the sequence of database commands is not the insert command followed by the delete command, performing:
setting the quantity of the net result equal to a final quantity sequentially located in the sequence of database commands; and
setting a price of the net result equal to a final price sequentially located in the sequence of database commands.

7. The method of claim 1 wherein the output entity is a data file and the contents of the data file are committed to the database as a unit of work.

8. The method of claim 1 wherein the database commands are generated by a stock trading application, the sequence of database commands are directed to an order book associated with a stock exchange symbol, and further wherein the order book is comprised of ranked price-time priority lists for buy and sell orders.

9. A system for reducing database workload volume, the system comprising:
a processor for executing instructions to facilitate:
collecting a sequence of database commands directed to a single database record in a database, the database commands comprising instructions for modifying data in the database;
setting a net result equal to a first database command in a sequence of database commands;
determining whether the net result is a delete command;
responsive to determining that the net result is not a delete command, preforming:
updating the net result equal to no database command and exiting in response to determining that the first database command in the sequence of database commands is an insert command and a subsequent database command in the sequence of database commands is the delete command;
updating the net result equal to the delete command in response to determining that the first database command is not the insert command and the subsequent database command in the sequence of database commands is the delete command; and
updating a quantity in the net result equal to a quantity in the subsequent database command in the sequence of database commands in response to determining that the subsequent database command in the sequence of database commands includes the quantity and the net result is not equal to the delete command; and
an output entity in communication with the processor for recording the net result in response to determining that the net result includes at least one database command;
wherein the reducing further comprises removing at least one database command in the sequence of database commands that is prior to the delete command in the sequence of database commands.

10. The system of claim 9 wherein the sequence of database commands is within a unit of work that has not been committed to the database.

11. The system of claim 9 wherein the reducing further comprises removing at least one database command in the sequence of database commands that is prior to the delete command in the sequence of database commands.

12. The system of claim 9 wherein the reducing further comprises:
removing a first update command in the sequence of database commands that is prior to a second update command in the sequence of database commands; and
setting the net result to the second update command if the second update command is not followed by another update command or the delete command in the sequence of database commands.

13. The system of claim 9 wherein the database commands are SQL statements.

14. The system of claim 9 wherein the reducing further comprises:
in response to determining that the first database command in the sequence of database commands is not the delete command, and further determining that the first database command in the sequence of database commands is not the insert command followed by the delete command, performing:
setting the quantity of the net result equal to a final quantity sequentially located in the sequence of database commands; and
setting a price of the net result equal to a final price sequentially located in the sequence of database commands.

15. The system of claim 9 wherein the output entity is a data file and the contents of the data file are committed to the database as a unit of work.

16. The system of claim 9 wherein the database commands are generated by a stock trading application, the sequence of database commands are directed to an order book associated with a stock exchange symbol, and further wherein the order book is comprised of ranked price-time priority lists for buy and sell orders.

17. A computer program product for reducing database workload volume, the computer program product comprising:
a storage medium readable by a processing circuit and storing instructions for execution by the processing circuit for facilitating a method comprising:
collecting a sequence of database commands directed to a single database record in a database, the database commands comprising instructions for modifying data in the database;
setting a net result equal to a first database command in a sequence of database commands;
determining whether the net result is a delete command;

responsive to determining that the net result is not a delete command performing:

updating the net result equal to no database command and exiting in response to determining that the first database command in the sequence of database commands is an insert command and a subsequent database command in the sequence of database commands is the delete command;

updating the net result equal to the delete command in response to determining that the first database command is not the insert command and the subsequent database command in the sequence of database commands is the delete command; and updating a quantity in the net result equal to a quantity in the subsequent database command in the sequence of database commands in response to determining that the subsequent database command in the sequence of database commands includes the quantity and the net result is not equal to the delete command; and writing the net result to an output entity in response to determining that the net result includes at least one database command;

wherein the reducing further comprises removing at least one database command in the sequence of database commands that is prior to the delete command in the sequence of database commands.

18. The computer program product of claim 17 wherein the sequence of database commands is within a unit of work that has not been committed to the database.

19. The computer program product of claim 17 wherein the database commands are generated by a stock trading application, the sequence of database commands are directed to an order book associated with a stock exchange symbol, and further wherein the order book is comprised of ranked price-time priority lists for buy and sell orders.

* * * * *